United States Patent
Bell et al.

(10) Patent No.: US 6,815,637 B2
(45) Date of Patent: Nov. 9, 2004

(54) APPARATUS FOR MARKING A VEHICLE

(75) Inventors: John T. Bell, Kent (GB); Geoffrey F. Hart, Kent (GB)

(73) Assignee: Retainagroup Limited, London (GB)

( * ) Notice: Subject to any disclaimer, the term of this patent is extended or adjusted under 35 U.S.C. 154(b) by 49 days.

(21) Appl. No.: 10/373,816

(22) Filed: Feb. 27, 2003

(65) Prior Publication Data

US 2003/0226835 A1 Dec. 11, 2003

(51) Int. Cl.[7] .................. B23K 26/00; B23K 26/08
(52) U.S. Cl. ................... 219/121.69; 219/121.61
(58) Field of Search ............ 219/121.6, 121.68, 219/121.69, 121.65, 121.66, 121.85; 347/171, 224; 427/554; 264/400; 65/33.2; 430/346, 945

(56) References Cited

U.S. PATENT DOCUMENTS

| | | | |
|---|---|---|---|
| 4,973,819 A | | 11/1990 | Thatcher |
| 4,985,115 A | | 1/1991 | De Rossett, Jr. |
| 5,200,971 A | | 4/1993 | Wildermuth et al. |
| 5,298,717 A | | 3/1994 | DeRossett, Jr. |
| 6,080,958 A | * | 6/2000 | Miller et al. ........... 219/121.68 |
| 6,362,451 B1 | * | 3/2002 | Karni et al. ........... 219/121.68 |
| 6,593,541 B1 | * | 7/2003 | Herren ................ 219/121.67 |

FOREIGN PATENT DOCUMENTS

| | | |
|---|---|---|
| DE | 43 26 314 A1 | 2/1995 |
| DE | 197 32 306 A1 | 1/1999 |
| EP | 0436 037 A1 | 7/1991 |
| EP | 0 950 888 A2 | 2/1995 |
| EP | 0962 331 A1 | 12/1999 |
| GB | 2 271 308 A | 4/1994 |
| JP | 60 024295 A | 2/1985 |
| JP | 60 072692 A | 4/1985 |
| RU | 2 090 394 C1 | 9/1997 |
| WO | WO 91/15045 | 10/1991 |
| WO | WO 92/03859 | 3/1992 |
| WO | WO 94/15384 | 7/1994 |
| WO | WO 96/05637 | 2/1996 |
| WO | WO 97/34343 | 9/1997 |
| WO | WO 99/08347 | 2/1999 |
| WO | WO 00/77895 | 12/2000 |
| WO | WO 01/62431 | 8/2001 |

* cited by examiner

Primary Examiner—Samuel M. Heinrich
(74) Attorney, Agent, or Firm—Dickstein Shapiro Morin & Oshinsky LLP

(57) ABSTRACT

The present invention provides a method and apparatus for marking vehicles using a laser. In order to allow any part of the vehicle to be marked using a simple, strong laser beam delivery conduit, the laser is mounted on a structure 101 which extends over a vehicle station 102. The structure defines at least three laser mounting positions and preferably four laser mounting positions A, B, C, D, spaced apart from one another in two dimensions for mounting at least one laser apparatus 107. The laser apparatus 107 comprises a laser emitter 108 for producing a laser beam adapted to mark a part of the vehicle and laser beam delivery means 110 for delivering a laser beam from the laser emitter 108 to a selectable point of the vehicle station 102. The laser apparatus 107 is movable between at least two and preferably all four of the laser mounting positions A, B, C, and D.

17 Claims, 10 Drawing Sheets

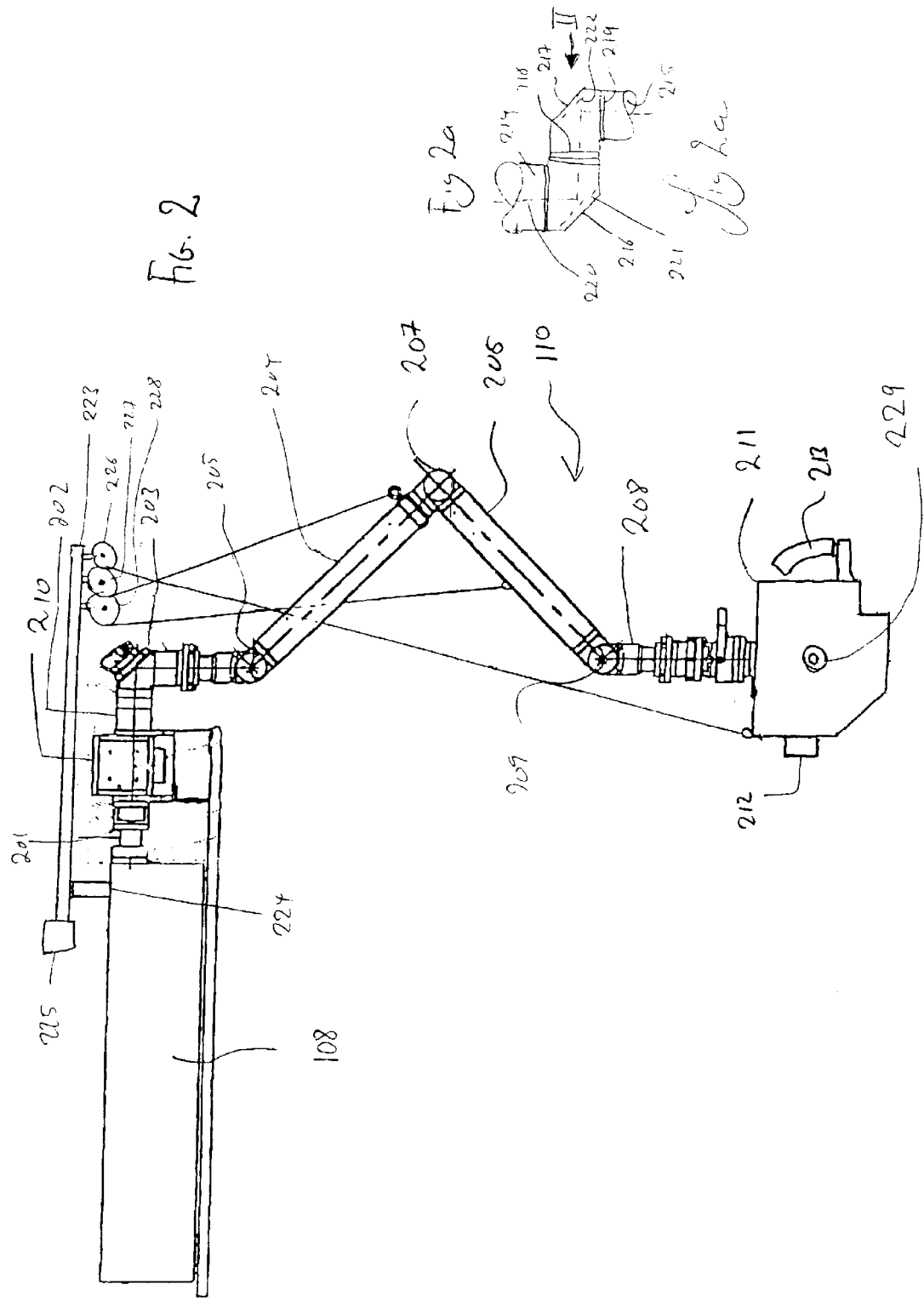

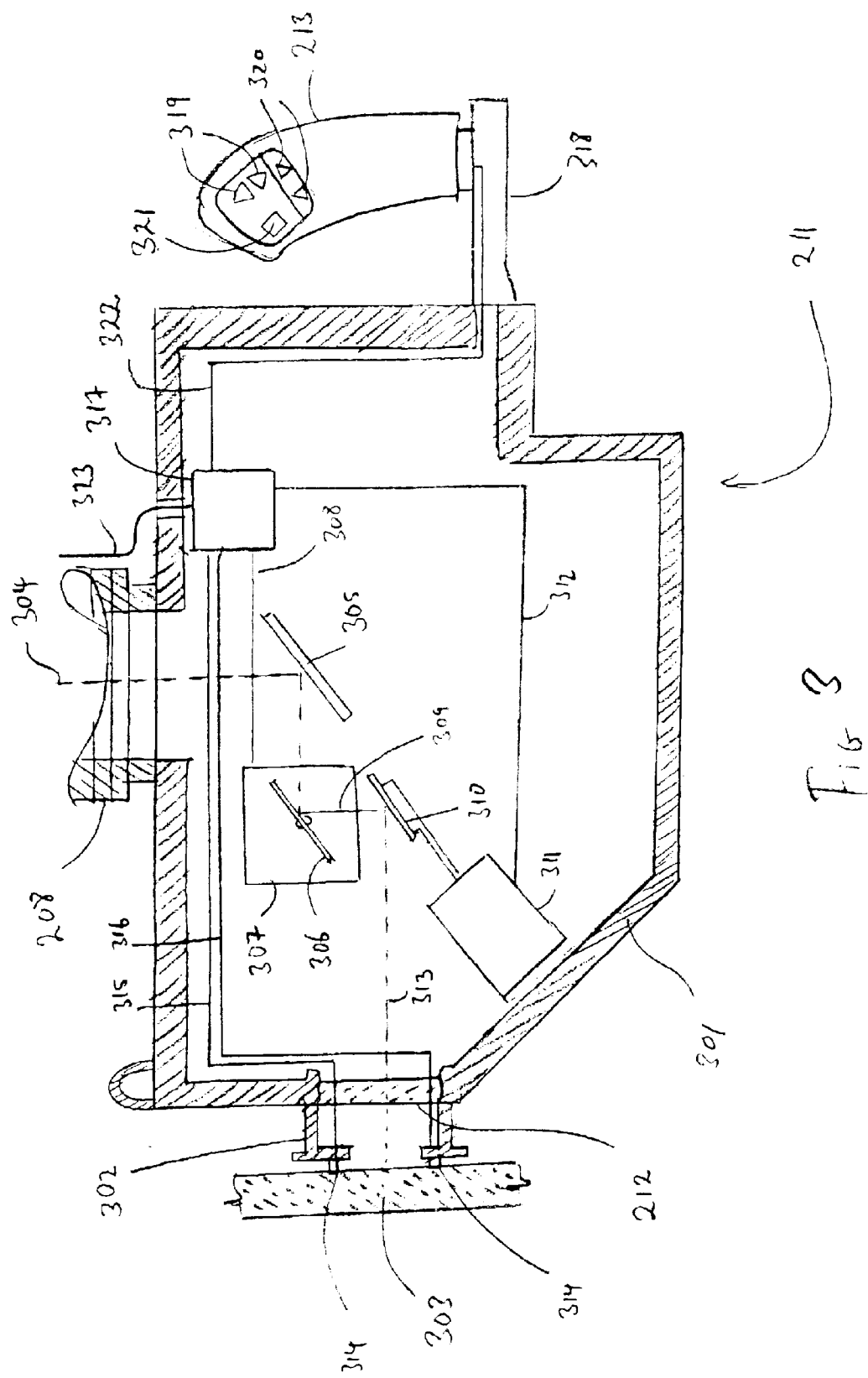

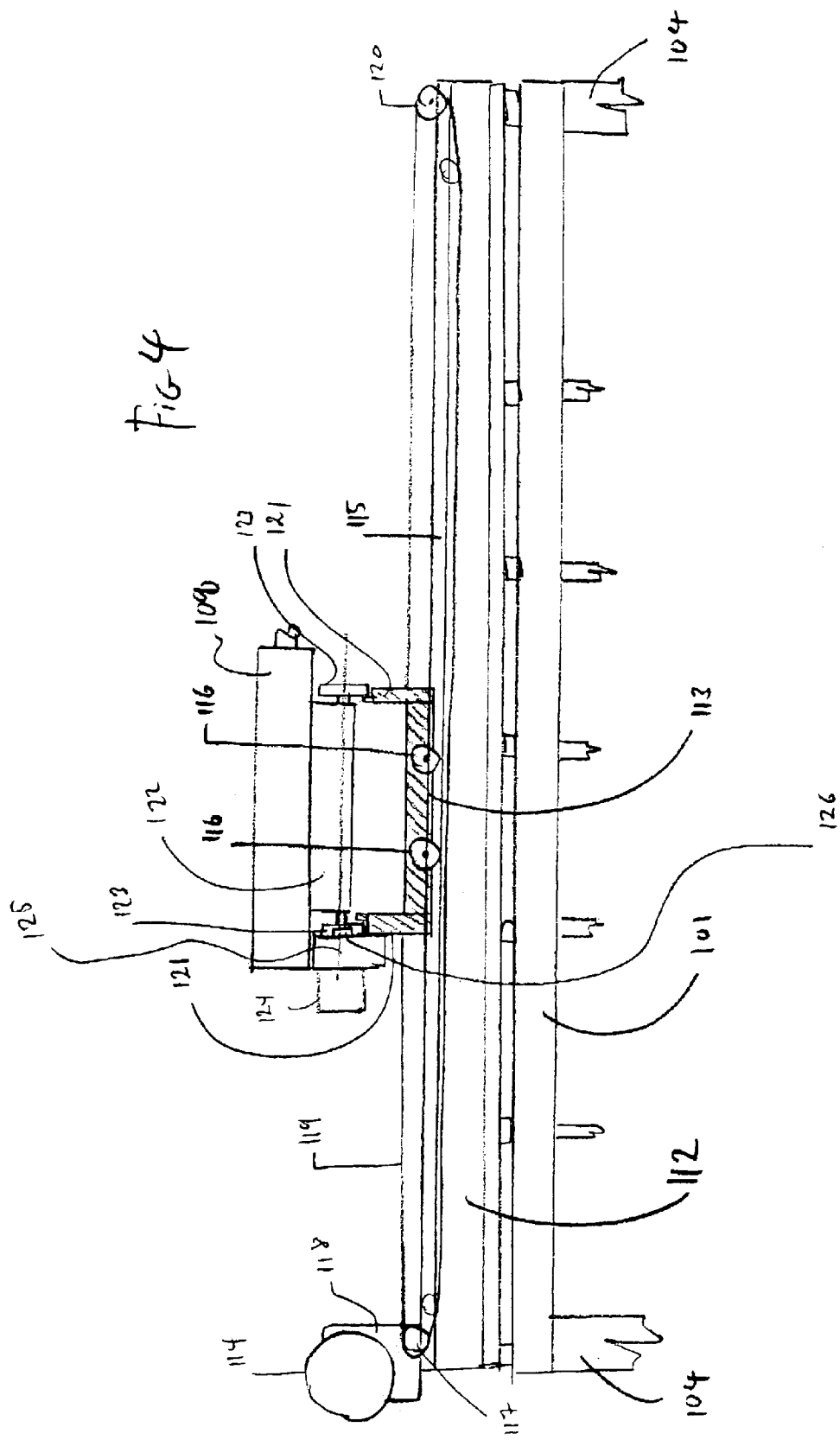

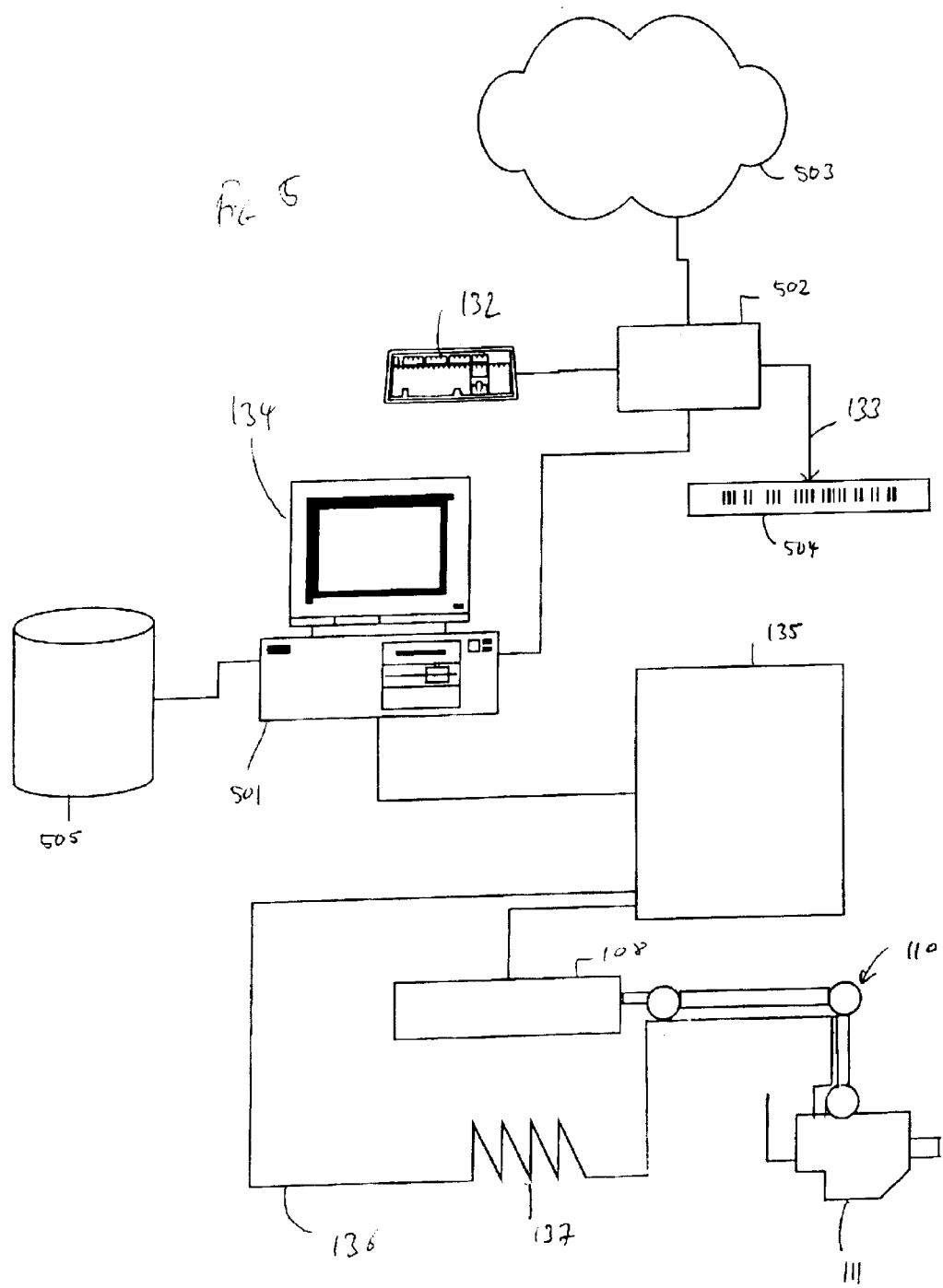

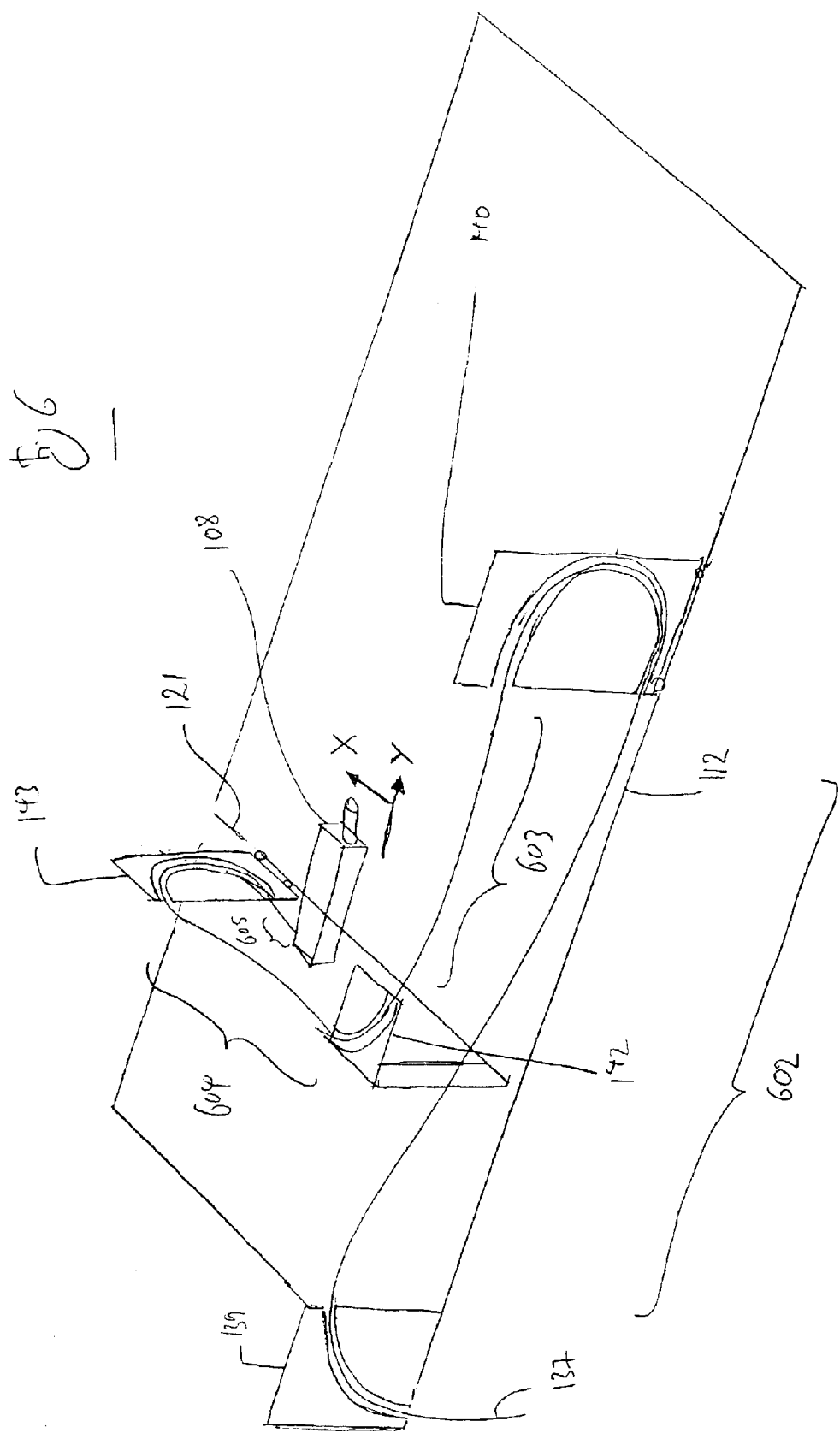

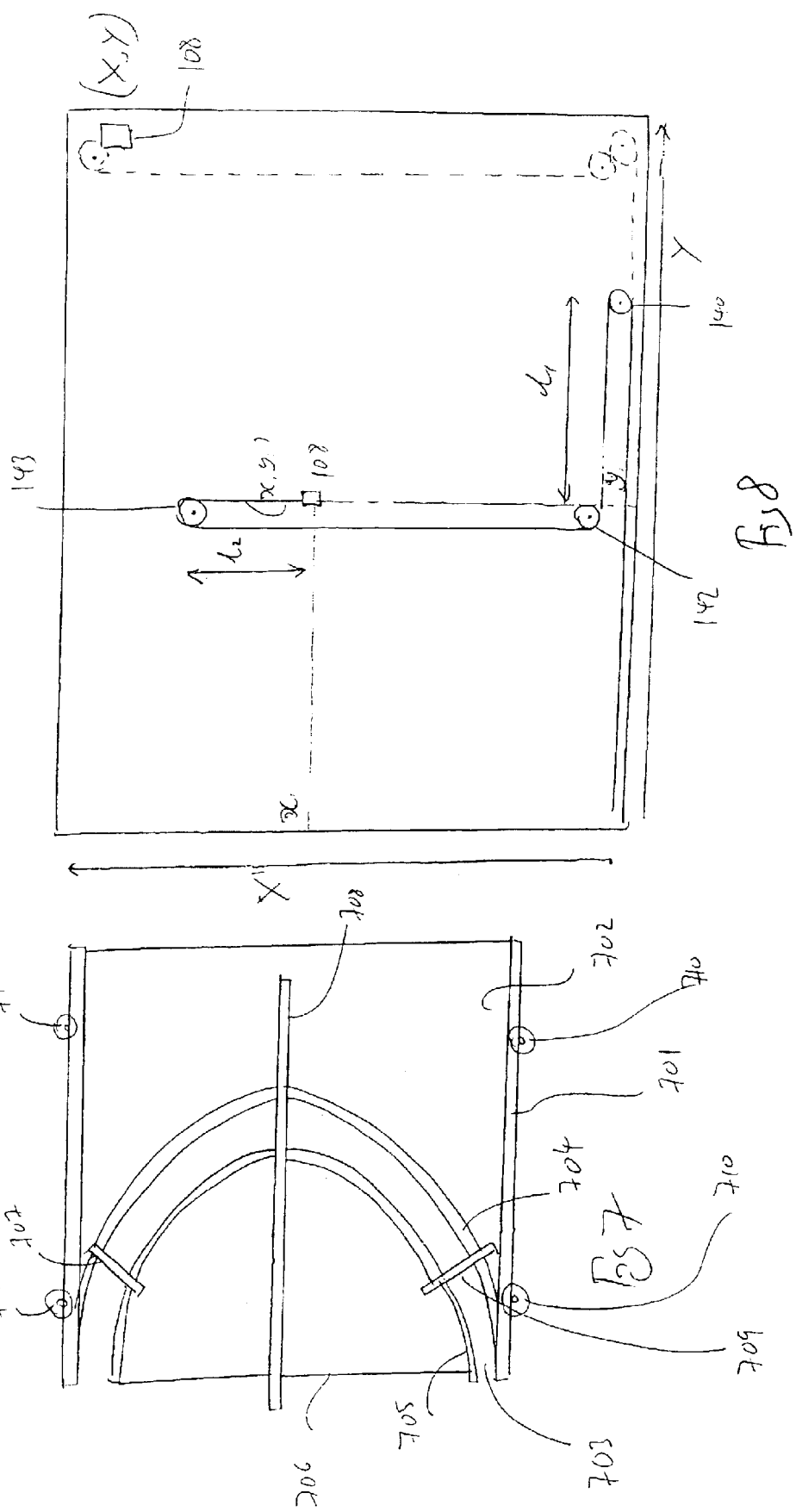

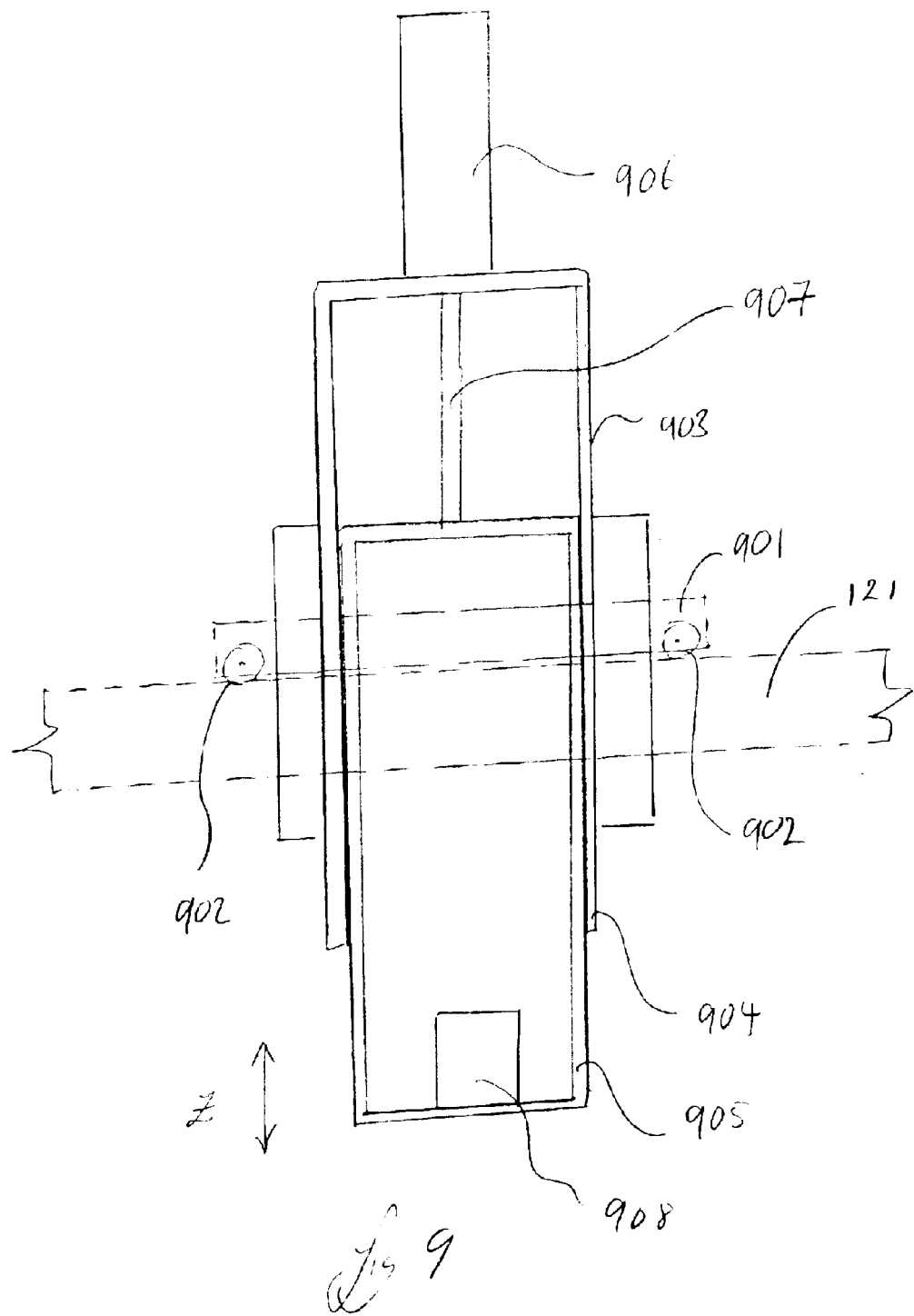

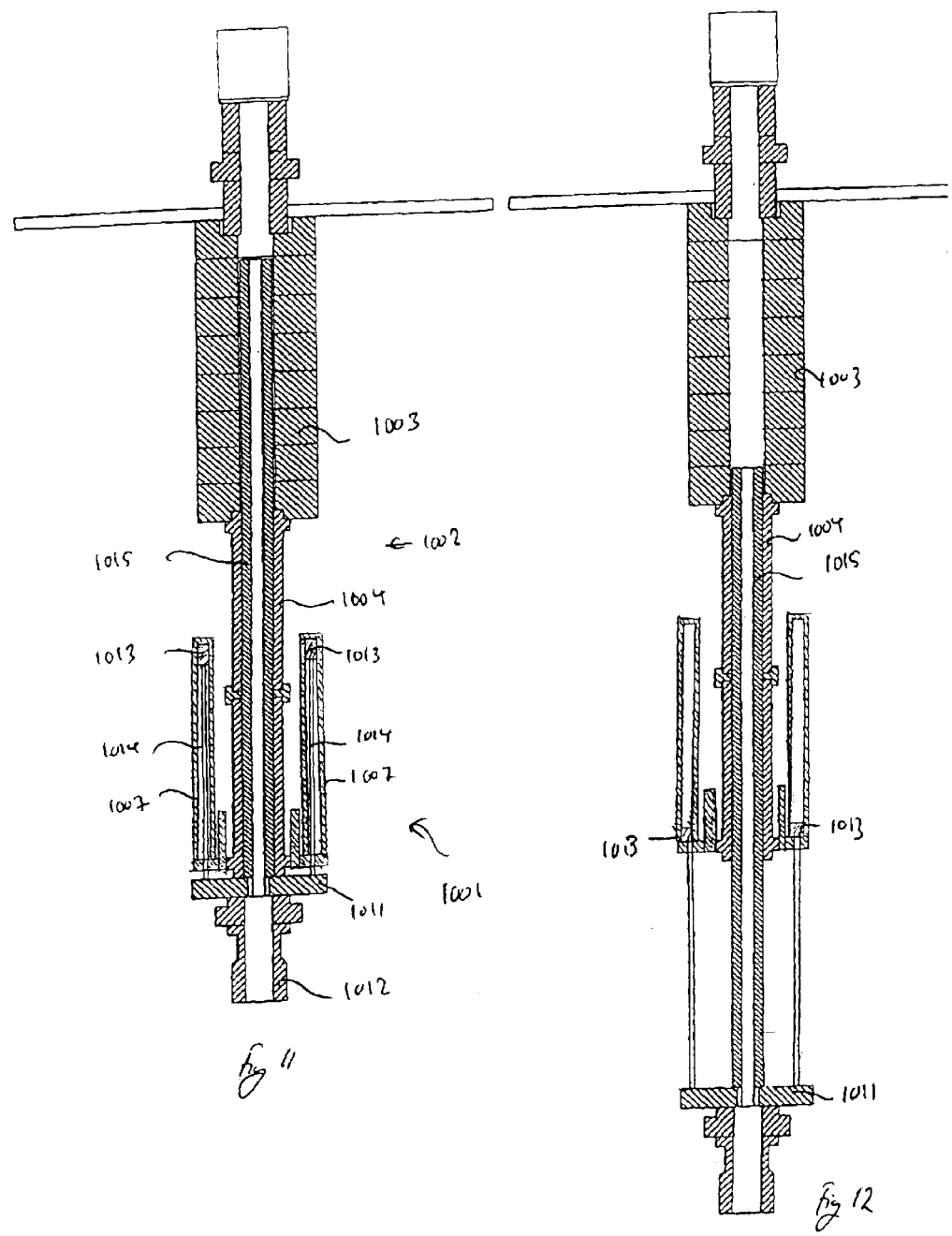

APPARATUS FOR MARKING A VEHICLE

The present invention relates to an apparatus and a method for marking a vehicle.

Vehicle marking is particularly important as a method of discouraging theft of vehicles. If at least one indelible mark is applied to a part of the vehicle, it will be difficult for thieves to disguise the identity of the stolen vehicle when they try to sell it. Indelible marks can be applied to secret or enclosed spaces within the structure. However, such marks have the disadvantage that they are not readily viewable by purchasers. A highly visible indelible mark is required to deter theft.

Accordingly, a practice has arisen of applying marks to an outer surface of a vehicle in a position in which they will be readily visible. These marks may be made in any suitable part of the structure, however, it is particularly preferred to make the marks in the windows of the vehicle. It is usually not possible to remove a mark from window glass. The windows of the vehicle cannot be covered up or painted over by a thief to disguise the identity of the vehicle. It is impossible remove a laser etched mark from window glass without either repolishing the entire surface or, leaving a clear indication that the glass has been tampered with. Repolishing the glass would require removal of the glass from the vehicle.

It is well known in the art to apply a mark to the window glass of a vehicle by an etching process. Typically, a stencil is used defining a unique code which allows the vehicle to be identified, an etching material being applied through the stencil to the window glass. Typically, the etching material comprises hydrogen fluoride or related materials. However, these are very dangerous materials to handle and the process is extremely difficult to automate.

A system of making marks in glass using a laser has been proposed, for example in U.S. Pat. No. 5,298,717. In this case, a carbon dioxide laser is used which generates a laser beam which will make a mark on the surface of glass. The system further includes a controller for providing signals for controlling the laser beam and a laser beam steering system comprising a pair of mirrors whose axes are orthogonal. In use, the laser beam impinges first on one mirror and then on the second mirror, the angular positions of the mirrors being altered in response to signals from the system controller to move the position of the laser beam and thereby cut a suitable pattern onto the glass. In one embodiment, the laser is suspended by a flexible mounting from a gantry which is located above a vehicle station. In another embodiment, the laser itself is mounted on the gantry, a flexible arm being provided, down which the laser beam may be directed to a marking head which contains the mirrors for deflecting the laser beam in the required pattern. The laser emitter mounted on the gantry can be displaced from front to rear of the vehicle as required by the operator.

This prior art device has a number of disadvantages. In the first place, the laser emitter requires to be very robustly constructed to prevent damage and to protect workers. It further requires extensive cooling equipment in order to allow it to operate continously for long periods. In practice, it has been found that it is impractical to mount a sufficiently well constructed laser marking equipment on the end of the arm in the manner shown in the first embodiment. The resulting structure is too bulky and too difficult to operate. Accordingly, it has been found that the laser emitter must be mounted on the support structure or gantry above the vehicle station, in accordance with the second embodiment. However, the second embodiment has the disadvantage that the flexible arm down which the laser beam must be directed from the laser emitter to the marking head is itself liable to damage. The flexible arm must be constructed to a very high standard to ensure that the laser beam is directed down the arm along substantially the same axis whatever the angular position of the various parts of the arm, otherwise there is a danger of damage to the inside of the arm itself or deterioration in the quality of the marking due to an incorrect starting position of the laser beam. In use, the flexible arm is repeatedly moved and subjected to continual strains and occasional impacts. In practice, it has been found that flexible arms of the known type have had to be adjusted approximately once a month.

There have further been problems with the use of a laser to mark glass, because it is sometimes found that the laser produces a mark which is not very clear. On the other hand, at other settings of the laser, it is found that the glass can crack, which is clearly not desirable.

The inventors have sought ways to overcome these problems.

The inventors have sought optimum settings for a glass marking laser, as will be described further below.

The inventors have realised that the problem with existing flexible arms for this purpose is that they are too long and too complex and the individual components are too long. The inventors have realised that the flexible arm may be made much more robust and reliable if it can be made shorter and if the components can be made shorter.

The present inventors have further realised that existing flexible arms have been subjected in use to too much twisting and stretching. This is as a result of the repeated manoeuvering of the marking head by the user to contact numerous parts of the vehicle. The present inventors have yet further realised that these problems can be overcome by placing the laser emitter to one side of the vehicle, so that the arm can be made relatively short. However, in order to allow both sides of vehicle to be marked without moving the vehicle, it is necessary to either place a second laser on the opposite side of the vehicle or to move the first laser from side to side of the vehicle. In addition, it is necessary to be able move the emitter from front to rear of the vehicle.

The inventors have found that these requirements can be met by providing at least three laser mounting positions on the structure, the laser mounting positions being displaced from one another in at least two dimensions. Coverage of all aspects of the vehicle can be obtained if the laser is movable between two of the laser mounting positions and a further laser is mounted at the remaining laser mounting position or if the laser is displaceable between all three of these positions.

Accordingly, the present invention provides an apparatus for marking vehicles, comprising:

a structure extending adjacent to a vehicle station;

the structure defining at least three laser mounting positions spaced apart from one another in at least two dimensions, for mounting at least one laser apparatus, the laser apparatus comprising a laser for producing a laser beam adapted to mark a part of the vehicle and flexible laser beam delivery means for delivering a laser beam from the laser to a selectable point of the vehicle station, the laser apparatus being movable between at least two of the laser mounting positions.

The structure may extend alongside a vehicle station, or at one or other end of the vehicle station or above the vehicle station. The structure may extend on both sides of a vehicle station, for example, the vehicle station may comprise a conveyor belt with the structure on either side of the belt.

The structure may be of any suitable design. Preferably, it comprises a framework and a support or supports for suspending the framework over or adjacent to the vehicle station. The framework may comprise walls, columns or other rigid structural members, for example lattice work structures. The vehicle station may be defined by a surface which is integral with the structure or it may comprise a region of an existing surface, on which the support or supports are mounted. The vehicle station preferably corresponds in size to the size of a vehicle to be marked. Preferably, the vehicle station is of a width such that when a vehicle is parked in the vehicle station, there is sufficient space at either side of the vehicle for an operator to move along the vehicle. Preferably, there is sufficient space for the doors of the vehicle to be opened, to allow access.

The space on either side of the vehicle maybe for example 0.3 to 1.0 meters wide, preferably 0.4 to 0.6 meters wide. Preferably, the structure is open at at-least one end of the vehicle station so that a vehicle may be driven into the vehicle station. More preferably, the vehicle station is open at both ends so that the vehicle may be delivered in one end and out the other. This improves the vehicle flow through the apparatus. The vehicle may be driven in or propelled along a conveyor.

The frame work may be comprised of any suitable structure, for example it may be constructed from substantially flat members, beams or combinations thereof.

The support for the framework may support the framework on only one side, the framework being cantilevered out from the support. Alternatively, the supports may be located on both sides of the framework.

In an alternative embodiment, the supports are for supporting the framework from a member such as a ceiling or beam located above the vehicle station.

The vehicle station is suitably of a width in the range 2.5–5.0, more preferably 3.0–4.0 meters in width and 3.5–7.0, more preferably 4.0–6.0 meters in length. Suitably, the framework is supported at a height in the range 1.5 meters–3.0 meters, more preferably 2.0 meters–3.0 meters above the vehicle station. The framework is preferably of substantially the same length and width as the vehicle station, though it may be wider and longer, for reasons set out further below.

The structure, in particular the framework of the structure, defines at least three laser-mounting positions.

The at least three laser mounting positions are spaced apart from one another in at least two dimensions. They may be spaced apart from one another in a plane which is substantially parallel to the vehicle station, the plane being suitably substantially horizontal. Alternatively, they may be spaced apart in a direction substantially at right angles to the vehicle station, for example in a substantially vertical plane. Preferably, there are at least four laser mounting positions spaced apart from one another in at least three dimensions.

For example, there may be two laser mounting positions which are locatable above one end of the vehicle station, being spaced from one another in the lateral direction of the vehicle station and a third laser mounting position mounted at the other end of vehicle station, displaced from the other two laser mounting positions in the longitudinal direction of the vehicle station. The first, second and third laser mounting position may be mounted in substantially the same horizontal plane. Alternatively, at least one laser mounting position may be located vertically below the others. The at least three laser mounting positions may be located in a horizontal plane or they may be located at different heights. This allows a laser at the lower laser mounting position to mark parts of the vehicle which are lower, for example headlights, tail lights, fenders, registration plates etc. A first laser apparatus may be provided which is movably mounted between the first two positions allowing any position on the rear of the vehicle to be marked. A second laser apparatus may be mounted at the third laser mounting position for marking the other end of the vehicle.

Alternatively, there may be three laser mounting positions, a first laser apparatus being movable between a first and second laser mounting position and a second laser apparatus being movable between the second and third laser mounting positions. In this way, the two laser apparatus can be positioned at substantially any position for marking the vehicle.

In a more preferred embodiment, there are at least four laser-marking positions. These are preferably located in a substantially rectangular pattern. Preferably, the at least four laser marking positions are located in the same horizontal plane. A first laser apparatus is preferably movable between a first and second laser mounting position and a second laser apparatus is movable between the third and fourth laser mounting positions. Suitably, the first and second laser mounting positions are located substantially to one side of the vehicle station and spaced apart from one another in the longitudinal direction of the vehicle station, the third and fourth laser mounting position being similarly arranged. However, it is possible for the first and second laser mounting positions to be spaced apart from one another in the lateral direction of the vehicle station. The respective laser mounting positions between which a laser apparatus is movable may be spaced apart from one another by any suitable distance. Preferably, the distance is substantially the same as the width of a vehicle to be marked, being suitably in the range 2.5 meters–4.5 meters, more preferably 3.0–4.0 meters if the positions are spaced apart in the lateral direction, or 3.5–5.0, more preferably, 4.0–5.0 meters if they are spaced apart in the longitudinal direction.

Similar comments apply to the rectangular pattern.

In a further preferred embodiment, there are at least eight laser marking positions. Preferably, there is a first set of four laser marking positions located in a substantially rectangular pattern in a first plane and a second set of four laser marking positions located in a substantially rectangular pattern in a second plane, the first rectangular pattern being substantially identical to the second rectangular pattern and located substantially vertically above it.

In a further preferred embodiment, there are four laser mounting positions which are preferably spaced apart in a substantially rectangular pattern as described above. However, in this embodiment, a laser apparatus is provided which is movable between all of the first, second, third and fourth laser mounting positions. In this way, a very wide range of coverage can be obtained with a single laser. Similarly, if there are eight laser mounting positions, the laser apparatus is preferably movable between all eight laser mounting positions.

For example, at least one first track may be provided extending between a first and second laser mounting position along which a first laser support is movable, a second track being provided extending from the first laser support in a direction which is not parallel to the first track, a second laser support being provided which is movable along the second track, the laser apparatus being mounted on the second laser support.

In this way, the position of the laser apparatus can be defined by a pair of co-ordinates representing the displacement of the first laser support along the first track and the displacement of the second laser support along the second track. Suitably, the second track extends generally at right angles to the first track, the position of the laser apparatus being defined by a pair of Cartesian coordinates (X, Y).

Where there is a first pattern of laser mounting positions in one horizontal plane and a second pattern of laser mounting positions in a second horizontal plane located at a different height to the first horizontal plane, a third laser support may be provided, movable with respect to the second laser support, the laser apparatus being mounted on the third laser support. The third laser support may suitably comprise a telescopic arm, pneumatic or hydraulic cylinder, motor driven screw or other apparatus. In this way, a third co-ordinate, Z, can be defined for the position of the laser apparatus In all cases where the laser apparatus is movable between a first and second laser mounting position, the position of the laser apparatus is preferably substantially continuously variable between the two positions. This allows very fine positioning of the laser apparatus so that optimum positioning can be obtained for making a mark on a given part of a vehicle.

It is also possible for the laser apparatus to be displaceable between first and second laser mounting positions by a combination of rotation of a first laser support around a pivot and displacement of the laser apparatus along a track on the first laser support.

In all cases where the laser apparatus is movable between a pair of laser mounting positions, there is suitably a motor for driving the laser apparatus.

The motor may move the laser apparatus by any suitable mechanism. For example, the motor may be fixed with respect to a track, the motor driving a linearly extending transmission which is connected to the laser apparatus or mounting therefor. For example, the transmission may comprise a rigid rod, a chain or a cable driveable by the motor. Alternatively, the motor may be mounted on the laser apparatus or mounting therefore, a transmission being provided, driveable by the motor, and engaging a track fixed on the framework. For example, there may be a friction drive between the laser support and the track or a rack and pinion drive. Alternatively, the track may comprise a chain or cable engaging the transmission of the motor.

Control means may be provided for controlling the position of the laser apparatus. This may be controlled centrally by a computer in an automated system. Alternatively, means may be provided for controlling the position of the laser apparatus, the means being operable by a user. For example, the control means may be provided on the laser beam delivery means as will be described further below.

The laser apparatus comprises a laser, which will be described further below. The laser will typically be of weight in the range 20–40 kg, for example around 30 kg, for example 32 kg. There may be a pair of lasers, a second laser acting as a standby for a first laser in case the first laser fails, to minimise down time.

The laser apparatus suitably comprises laser-cooling means, for example air or water cooling means. Preferably, a pumped fluid cooling system is used. The pumped fluid cooling system may comprise a first part, including pump apparatus mounted on the framework or on supports of the framework, a cooling circuit mounted on the laser apparatus and a flexible connection therebeteween, for example flexible hoses for input and out put of cooling fluid.

The first or second track, or both of them suitably comprises a pair of track members extending parallel to and spaced apart from one another to provide optimum support for the first or second laser apparatus support.

The laser beam delivery means should perform several functions:
1. It should provide a path extending from the laser to a laser exit point which path is totally enclosed, to protect operators and other equipment from damage.
2. The path from the laser to the exit point must be flexible Laser beam conduits which meet these requirements are well known from the art of laser beam welding.

A suitable such laser conduit comprises at least two laser conduit sections joined together at connections, the conduit sections being rotatably mounted with respect to each other at the connections about one and preferably two axes. Preferably, there are at least three, most preferably at least four laser conduit sections. Preferably, the connections between laser conduit sections comprise mirrors for diverting the laser at the connections when the laser conduit sections meet at an angle. Apparatus of this type is well known in the art of laser beam welding. The laser beam conduit sections may be substantially straight or they may comprise two sub-sections rigidly joined together at an angle, in which case a turning mirror must be provided within the laser conduit for turning the laser beam. Suitable apparatus is obtainable for example from Laser Mechanisms Inc. of Southfield Mo. United States. In order to obtain a wide range of movement, there are preferably at least three connections, the laser beam conduit sections being rotatable at each connection about two axes.

The laser beam conduit sections may be made rotatable with respect to each other about two axes by providing connections which comprise a first engagement part, rotatably connectable to a first laser beam conduit section, rotatable about a first axis and a second engagement part, rotatably mounted with respect to the first engagement part. Each engagement part may comprise a laser turning mirror. The second engagement part may also rotatably mounted with respect to a second laser beam conduit section, to give optimum flexibility.

The laser conduit sections may be provided with protective material, for example, a resilient coating, to further protect them from damage.

The present invention allows the laser beam conduit sections to be relatively short. For example, each section may be no more than one meter long, preferably no more than 800 mm long preferably no longer than 700 mm and preferably in the region 400–650 mm in length.

This aspect of the invention is particularly important. In particular, it is found that, in order to avoid accidental damage of the laser beam delivery means by collision with other objects or damage to other objects, it is desirable to keep the individual laser beam conduit section lengths as short as possible. At the same time, it is necessary to be able to mark a wide variety of locations at different positions on a vehicle. The inventors have discovered that the optimum arm length for safety, manoeuvrability and ability to reach a wide range of vehicle locations are given by the lengths above.

The entire laser beam delivery means is suitably no more than 3.0 m in length, preferably no more than 2.5 m and preferably less than 2.3 m in length.

The internal diameter of the laser beam conduit is suitably in the range 10–20 mm. The external diameter is suitably in the region –100, more preferably 70–90 mm.

There may be a first laser beam conduit section, rigidly connected to the laser and flexibly connected to a second laser beam conduit section, which is itself flexibly connected to a third laser beam conduit section. Finally, there may be a fourth laser beam conduit section flexibly connected to the third laser beam conduit section and rigidly connected to a marking head.

The at least one conduit suction may be of a variable length. This helps to improve the flexibility of the apparatus, by providing a means for shortening at least one conduit section.

Suitably, the conduit section comprises a first conduit section component telescopically mounted inside a second conduit section component. Drive means may be provided for moving the first conduit section component with the respect to the second conduit section component to increase or decrease the length of the structure.

It is particularly preferred that a conduit section with variable length be placed immediately adjacent to the laser beam source. It is found that the laser beam mounting provides a suitable mounting for the variable length conduit section and drive means.

It is particularly preferred that the conduit section of variable length is configured so that the conduit section axis is substantially vertical, so that vertical raising and lowering of the laser beam delivery means can be obtained.

The apparatus of the present invention preferably comprises a marking head. The marking head is adapted to contact the part of the vehicle to be marked, and deliver the laser beam to the part of the vehicle to marked, the marking head further including means for deflecting the laser beam to define a pattern required to form the mark.

The mark formed may be of any suitable type, for example an alpha numeric code of specified number of characters in a specified number of rows. Alternatively, it may comprise a graphic symbol, logo or other mark. In all cases, it is necessary to move the laser beam across the surface of the path of the vehicle to be marked in two dimensions. The mark may be formed in a dot matrix pattern by scanning the laser beam across the surface of the part of vehicle to be marked in a rasterscan pattern. Alternatively, the characters can be scribed individually.

In order to deflect the laser beam in two dimensions, any suitable system may be used. However, preferably at least one mirror is provided which is rotatable about at least one axis to deflect the laser beam. Preferably, a pair of mirrors in sequence are used, each intersecting the laser beam and each being rotatable about a respective fixed axis. Preferably the axes about which the mirrors are rotatable are orthogonal to one another. The rotation of the mirrors is controlled by any suitable means. Preferably, the rotation of the mirrors is controlled by galvanometers which are found to move quickly and effectively. A suitable arrangement is described for example in U.S. Pat. No. 5,298,717.

The marking head will further comprise a light-tight casing for presenting leakage of laser radiation, to protect operators.

A part of the casing will be comprise a window of a material which is transparent to the laser radiation used. For example, where a carbon dioxide laser is used (as discussed further below), the window may comprise germanium.

The marking head will suitably comprise control means operable by the operator.

These control means suitably include means for commencing laser marking when the marking head is in position. The control means further comprises means for controlling the position of the laser apparatus as described above.

The control means preferably includes a safety device. The safety device suitably comprises at least one switch which is only closed when the marking head is in the correct position on a part of the vehicle to be marked, in order to prevent the apparatus being accidentally fired. Preferably, there are at least three switches, all of which have to be depressed when the marking head is in correct position, the laser being inoperable until all three switches are depressed. This ensures that the marking head is in position before the laser is fired to prevent distortion of the mark applied and to prevent escape of laser radiation.

The marking head may further comprise a resilient seal around the marking head to further prevent leakage of radiation.

Means may be provided for cleaning the laser beam window to prevent loss of light or focus. For example, an air jet may be provided for blowing deposits off the laser beam window and to prevent contamination of lenses.

Preferably, means are provided for collecting material released during the marking of the window glass. For example, glass dust may be collected. The collecting means may comprise a simple container. However, in order to catch the relatively light particles of glass, an adhesive surface may be provided. For example, a piece of double sided adhesive tape may be employed.

Support means may be provided for bearing the weight of the laser beam conduit and marking head. The support means suitably comprises flexible means, such as jointed rods, cables, chains or the like. Suitably, the flexible means are mounted on the laser marking apparatus. The flexible means may depend from a beam, for example a rotatably mounted beam mounted on the laser mounting.

The flexible means may comprise locking pulleys, comprising a length of wire wound around a reel, the reel being acted upon by resilient means such as a coil spring, tending to rotate the reel in the direction in which the wire is wound onto the reel, locking means being provided for fixing the reel or the wire, the locking means being releasable for example by applying tension to the wire. There may be a single flexible means for supporting just the marking head. Preferably, however, each flexible element of the laser beam delivery means is individually supported by a separate support means.

Suitable locking pulleys are available from the company Nedderman.

The total weight of the movable parts of the laser marking apparatus, including lasers, laser beam delivery means, support means etc is suitably as small as possible, in order to allow it be easily moved. For example, a total weight in the range 100 kgs–300 kgs, more preferably 150 kgs–200 kgs would be suitable. This may be obtained by using commercially available components formed in light material, such as aluminium or composite material such as glass reinforced plastic.

Where the mark to be made on the vehicle comprises a character as described above, it is necessary to deflect the beam in at least two directions and to switch the beam on and off whilst forming the characters. Preferably, at least one of the position of the beam and the duration of the beam, preferably both, are controlled by a control system. The control system may be mounted in the marking head, in the laser apparatus or at another position on the apparatus of the invention. For example, the control may be mounted adjacent to the vehicle station.

Where security codes are to be marked onto vehicles, it is generally necessary for at least one component of each code to be unique to the vehicle which is being marked. Accordingly, input means may be provided for inputting to the controller the code required for each vehicle. The code may be input manually, for example using a keyboard. Alternatively, the code may be transmitted to the control system via a communications network such as the Internet or by dedicated communication lines such as telephone lines. Alternatively, the control system may be provided with a scanner for reading information relating to the code to be marked on each vehicle. For example, the scanner may comprise a bar code reader of the sort well known in the art.

The control system suitably comprises a personal computer or a similar computer programmed to control the apparatus.

For example, the control system may comprise a processor connected to at least one memory, the memory being for storing data comprising, for each vehicle to be marked, vehicle marking data (for example the vehicle identification number), the code to be marked on the vehicle and the date on which the mark is made. Preferably, an input is provided for inputting to the processor the vehicle data, the processor being adapted to enter the vehicle data into the memory.

The processor is preferably further connected to a laser controller. In order to mark a given vehicle, its Vehicle Identification Number, which is a unique number assigned to that vehicle by an international organisation, is input to the processor. The processor then extracts from the memory code data required to be marked on the vehicle. The code data is then transferred to the laser controller. The controller itself is connected to the laser and, separately, to the marking head. The laser controller controls the laser by switching it on and off, in co-ordination with the movement of the laser beam by the laser marking head so that the required code is marked onto the vehicle. Once the vehicle has been marked the required number or times, a signal can be input to the processor to indicate that the vehicle has been marked. The processor then writes the confirmation of marking and the date of marking into a second memory.

The processor is preferably configured to delete the marking data from a memory to prevent the same mark being applied to a second vehicle. The marking data may be entered into the second memory to provide a record.

The apparatus of the invention may be used to mark any suitable part of a vehicle. However, it is particularly preferred to use the apparatus of the invention to mark at least one window of the vehicle.

The present invention has the advantage that, because the positions of suitable parts of windows to be marked in different designs of vehicle are different and because the position of the vehicle parked in the vehicle station may be different every time, the operator is still able, because of the flexibility of position of the laser apparatus, to put the marking head in the ideal position for making a mark.

In order to mark windows of a vehicle, the glass self may be marked or, alternatively, the organic inter layer formed between sheets of laminated glass may be marked.

In the first process, a laser beam must be used which is strongly absorbed by glass. It is found that the laser beam emitted by a carbon dioxide gas laser or an excimer laser is suitable for this purpose.

For the second approach, a laser beam may be used which is not absorbed by glass but is absorbed by the organic interlayer. In this case, it is found that the beam generated by a neodymium/YAG laser may be used.

It has been found that, in order to avoid cracking the glass and in order to provide a mark which has clearly defined edges, a pulsed laser is suitably used. Preferably, the laser is pulsed by alternately switching it on and off. The frequency of pulsing is suitably in the range 10–100 kHz, more preferably 30–60 kHz, most preferably 35–45 kHz.

The average power of the laser is suitably in the range 5–20 watts.

The quality of the mark is effected by the ratio of time that the laser beam is switched on to the time the laser beam is switched off, called the duty ratio. Suitably, the duty ratio is in the range 20%–60% on, more preferably 30–50% or most preferably 35–45% on. For example, at 40 kHz, a 40% duty on ratio in the duty cycle will give a 10 millisecond burst of laser radiation followed by 15 milliseconds in which the laser is switched off.

The scanning speed also affects the quality of the mark. Preferably, the scanning speed is in the range 2000–8000, more preferably 3000–6000, most preferably 4000–5000 mm/s.

It is particularly preferred to match the duty cycle to the scanning speed and the average operating power of the laser. In particular, it is particularly preferred to operate within the parameters 5–20 watts, with a duty cycle in the range 30–50% and a scanning speed in the range 3000–6000 mm per second, more preferably operating at a power in the range 10–15 watts, with a duty cycle in the range 35–45% and the scanning speed in the range 4000–5000 mm/s These figures may be represented by a notional value of energy input per unit length. For example, when operating at 10 watts with a 40% duty cycle and a scanning rate of 4,500 mm per second, the energy per unit length is 10 0.4/4500= approx. 0.9 joules per mm. Preferably, to avoid cracking and to obtain a mark which is clearly defined, the energy per unit length is in the range 0.5–2.0 joules per mm, more preferably 0.75–1.2 joules per mm more preferably 0.8–1.0 joules per mm.

It has been found that, in order to mark window glass of vehicles, it is particularly preferred to use a carbon dioxide laser operating in the range 5–20 watts, more preferably around 10–15 watts.

Preferably the carbon dioxide laser is a high frequency excited carbon dioxide laser, preferably excited at a frequency in the range 10–50 MHz. Preferably, a radio frequency excited carbon dioxide laser is used. It is particularly preferred to use a slab laser.

Preferably, at least one of the duty cycle, average power output and scanning rate of the laser is controllable by the operator, and preferably all of these parameters are controllable by an operator.

Suitable radio frequency excited carbon dioxide slab lasers are manufactured for example by the company Rofin Sinar UK Ltd.

The laser used in the present invention may also be used to mark other parts of the vehicle than the windows, including headlights, plastic parts, painted body work or alloy wheels trims.

When a radio frequency excited laser is used, the laser requires a radio frequency electrical source for exciting the laser. This may be mounted on the laser apparatus. However, as such a source may be relatively heavy, the inventors have realised that the radio frequency source can be mounted elsewhere on the structure. The radio frequency signal can then be transmitted to the laser via a radio frequency cable of a type known in the art, for example from laser beam welding. For example, a copper cored coaxial cable may be used. Accordingly, in a preferred embodiment, the apparatus of the invention comprises a radio frequency source mounted on the structure and a flexible radio frequency transmitting cable extending from the radio frequency source to the laser apparatus.

The present inventors have discovered that care must be taken when using such a radio frequency transmitting cable to avoid kinking the cable, otherwise damage to the cable will ensue and loss of power. Accordingly, there is preferably provided a radio frequency transmitting cable extending between the supply of radio frequency and the laser apparatus, the cable being of variable configuration, the radius of curvature of each part of the cable being fixed at no less than 30 cm.

Preferably, the cable extends around, in sequence, a first curved track member of radius not less than 30 cm, the first curved track member being movably mounted with respect to the structure in a first direction, a second curved track member of radius not less than 30 cm, movably mounted with respect to the structure, and a third curved track member of radius of curvature not less than 30 cm movably mounted on the second track member, movably mounted with respect to the structure, in a direction at an angle to the first direction, and preferably at right angles to the first direction. In this way, the first, second and third curved track members can take up any slack in the cable, by moving and keeping the cable taut. The curved track members may comprise smooth curved guides or rotatable wheels. The curved track members may be propelled by motors or they may be propelled by the radio frequency cable itself, which may be relatively stiff.

Cooling means for cooling the laser apparatus may be provided. The cooling means may suitably comprise pumped liquid cooling means, for example pumped water cooling means. Refrigeration means may be provided for cooling the pumped liquid to improve the efficiency of cooling.

The present invention will be further described by way of example with reference to the accompanying drawings, in which:

BRIEF DESCRIPTION OF DRAWINGS

FIG. 2 is a sketch side view of laser apparatus for use in the present invention.

FIG. 3 is a schematic cross section through the laser marking head for use in the present invention.

FIG. 4 is a schematic side view of the laser mounting system.

FIG. 5 is a schematic view of a control system for use in the present invention.

FIG. 6 is a schematic isometric view of the radio frequency cable guide mechanism.

FIG. 7 is a side view of a movable guide member for use in the radio frequency guide mechanism.

FIG. 8 is a diagram showing the extension of the radio frequency cable.

FIG. 9 is a schematic diagram showing a second embodiment of laser mounting system.

FIG. 11 is a schematic cross-sectional view of the longitudinally extendable laser conduit section in the contracted state.

FIG. 12 is a schematic cross-sectional view through the longitudinally extendable laser beam conduit section in the extended state.

Figure 1:
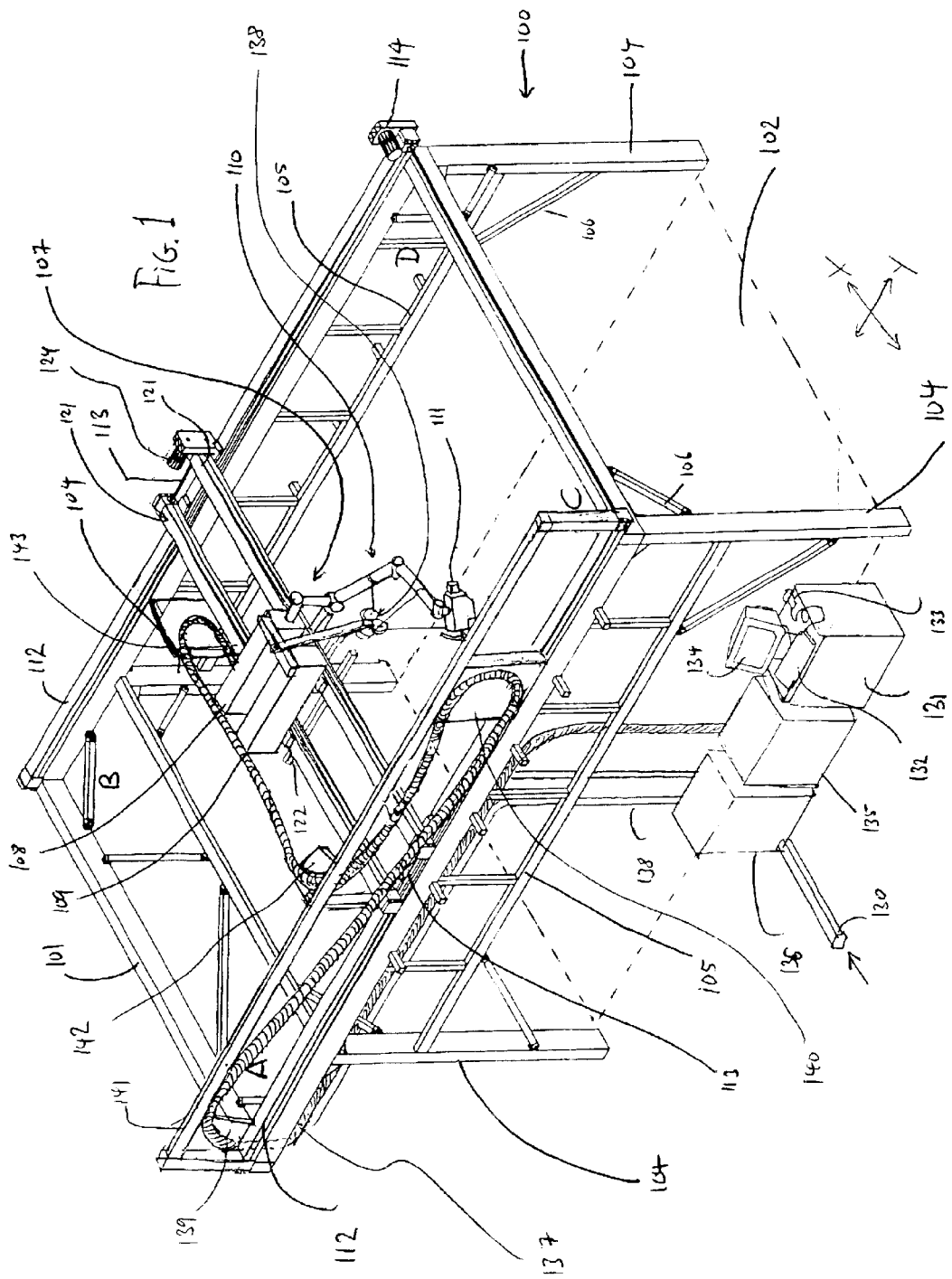
FIG. 1 is a sketch isometric view of an apparatus according to the present invention.

The apparatus, generally designated 100, shown in FIG. 1, comprises a structure 101 which is located above a vehicle station 102, the limits of which are shown in dotted lines.

A vehicle may be parked in the vehicle station 102 beneath the structure 101. The structure 101 comprises a framework which is mounted 2 m above the vehicle station 102 by a support comprising support columns 104 mounted at each corner of the vehicle station, together with strengthening members 105 and 106 for strengthening the support against horizontal forces. The vehicle station 102 is approximately 4.0 m wide and 5.0 m in length. A laser apparatus generally designated 107 is provided. The laser apparatus 107 comprises a pair of laser emitters 108 and 109. In use, only a single laser emitter, in this case 108, is connected up for use. The other laser emitter 109 is provided as a back up in case the first laser emitter 108 fails. Connected to the laser emitter 108 is a laser beam delivery arm 110, which will be described further below. The laser beam delivery arm 110 terminates in a marking head 111 which will be described further below.

The apparatus of the invention defines at least four laser mounting positions, designated A, B, C and D. The laser 108 is continuously movable between each of the positions A, B, C, and D. In order to achieve this, a first track is provided, comprising a pair of track members 112 located on opposite sides of the structure 101. A first laser support 113 is movably mounted on top of the track member 112. The first laser support 113 is mounted on the track member 112 by wheels engaging in recesses which extend along the track member 112. A motor 114 is provided, mounted at one end of one track member 112.

The arrangement is shown in more detail in FIG. 4. In FIG. 4, the top part of the structure 101 is shown, the support 104 being only partly illustrated for clarity. The track member 112 can be seen mounted on top of the structure 101. A recess 115 is formed extending along the top of the track. The first laser support 113 is shown, mounted on wheels 116, which run along the recess 115. The motor 114 drives a pulley 117 through a transmission 118, details of which are not shown. Transmission 118 is suitably a step down transmission so that the pulley 117 rotates more slowly than the motor 114. The pulley 117 drives a cable 119 which extends from one end of the first laser support 113, around the pulley 117, along a return loop to a second pulley 120 at the opposite end of the track 112 and back to the other end of the first laser support 113. When the pulley 117 is rotated in the anti clockwise direction, the first laser support 113 is displaced towards the left of FIG. 4. When it is rotated in the clockwise direction, the first laser support 113 is displaced to the right of FIG. 4.

The first laser support 113 further comprises a pair of tracks 121. A second laser support 122 is provided on which the lasers 108 and 109 are mounted. The second laser support 122 is displaceable along the tracks 121 on wheels 123. A similar arrangement of a motor 124, transmission 125 and pulley 126 is provided, engaging a cable (not shown) for displacing the second laser support 122 along the tracks 121. Motors 114 and 124 are electrically driven in response to control signals from a device mounted on the marking head 111, as will be described further below.

Also shown in FIG. 1 is a supply 130 of cooling water and electrical power for the apparatus. An input station 131 is shown comprising a keyboard 132 and a bar code reader 133 for receiving inputs of information relating to a vehicle to be marked. A VDU 134 is provided for displaying data input. A laser controller 135 is provided, for receiving signals from the input means 131. The laser controller 135 provides control signals by a cable (not shown) for controlling the position of the laser beam in the marking head 111. The laser controller 135 further provides a supply of radio frequency electrical power along a radio frequency cable 137. The radio frequency signal is delivered to the laser 108. The laser 108 comprises a radio frequency excited slabe carbon dioxide laser. When the radio frequency signal is supplied to this laser, laser emission commences. When the radio frequency exciting signal is broken, the laser emission ceases. The laser controller 135 can therefore be used to switch the laser 108 on and off. The laser is suitably a radio frequency excited slab carbondioxide laser. Suitably, it is excited at a frequency of 40 MHz. Suitably, it is a pulsed laser operating with a duty cycle of 40% on-time (e.g 10 milliseconds on followed by 15 milliseconds off). Suitably, it is operated at an average power of about 10 watts. Suitably, the laser beam is configured to scan over the surface of the glass (by apparatus to be described further below) at a rate of 4,500 mm per second.

Also shown in FIG. 1 is a support means 138 for the laser beam delivery arm, which will be described further below.

A cooling controller 136 is provided for controlling the temperature of the laser. In order to do this, cooling water is pumped to the laser via a pipe 138. The pipe 138 connects to a cooling circuit within the laser 108, whereby heat may be removed from the laser emitter 108.

Heat is dissipated from the cooling water by any suitable means. In practice, it is found that heat may be removed by a mixture of radiation from the pipe 138, conduction to air surrounding the pipe 138 and conduction to the relatively heavy support 104 and structure 101.

The radio frequency cable 137 is seen extending along the framework of the structure 101 from one end thereof.

It is important that the radio frequency cable should not be bent through a radius of less than 30 cm, otherwise damage to the cable may ensue. The radio frequency cable 137 is fixed to the framework and passes around a shaped guide 139 at the end of the framework. The length of radio frequency cable 137 extending from the guide 139 is substantially unsupported. It passes around a guide member 140 which has curved track of radius greater than 30 cm formed in it, in which the radio frequency cable slides, as will be described further below. The guide member 140 is slidably mounted on the track 112. It is also slidably mounted on a guide beam 141 at the top. From the top of guide member 140, the radio frequency cable 137 extends around a second curved guide member 142 which is fixed on the first laser support 113. From the second guide member 142, the radio frequency cable 137 is substantially unsupported until it reaches a third guide member 143 which is slidably mounted on the tracks 121. The third guide member 143 includes a curved track, in which the radio frequency cable 137 slides, the track being of radius greater than 30 cm. The third guide member 143 is movably mounted with respect to the second laser support 122. The radio frequency cable extends from the third guide member 143 to the second laser support 122.

In use, as the laser emitter is moved along the first and second tracks 121, 112, the radio frequency cable, which is relatively stiff, is pushed around the curved tracks in the movable guide members 139, 140, 142 and 143, displacing the movable guide members to take up slack in the radio frequency cable without producing kinks of too small a radius as will be further described below.

FIG. 2 is a schematic view of the laser apparatus and laser beam delivery means used in the apparatus of FIG. 1. The laser emitter 108 is shown at the top of the figure. The laser emitter 108 is coupled to a laser beam delivery means comprising a laser arm generally designated 110. In use, a laser beam is emitted from the end 201 of the laser 108. The laser arm 110 comprises a first laser conduit section 202 connected to the end 201 of the laser emitter. The first laser conduit section 202 comprises a rigid bend 203 provided internally with a turning mirror for reflecting the laser beam around the bend. The first laser conduit section 202 is connected to a second laser conduit section 204 at a flexible joint 205 which is rotatable about two axes at right angles to one another. Similarly, the second laser conduit section 204 is connected to a third laser conduit 206 at a flexible joint 207, which is again rotatable about two directions at right angles. The third laser conduit section 205 is further connected to a fourth and final laser conduit section 208 at a flexible joint 209. The first laser conduit section 202 incorporates an adjusting section 210 in which the line of travel of the laser beam may be adjusted so that it passes substantially centrally down the laser arm 110.

Each flexible joint 205, 207, 209 comprises a pair of turning mirrors for turning the laser beam so that it passes down the respective laser conduit section.

The second laser conduit section 204 is of length between the centre points of the turning mirrors in the flexible joints 205 and 207 of 620 mm. The length of the third laser conduit section 205 between the flexible joints 207 and 209 is 600 mm. In this way, the individual arm sections are relatively short, making the whole apparatus easy to control and avoiding damage to the arm or to neighbouring objects.

The fourth laser conduit section is connected to a marking head 211. The marking head 211 comprises means (shown in FIG. 3) for deflecting a laser beam in at least two directions at right angles to one another in response to control signals received from the laser controller 131 to thereby make a suitable pattern on the part of the vehicle to be marked. The marking head 211 comprises a laser beam exit 212 comprising a germanium window, which is transparent to radiation emitted by the laser emitter 108.

FIG. 2a is partial view showing the construction of the flexible joints 205, 207, 209. In FIG. 2, the flexible joints 205, 207, 209 are seen in the direction of the arrow II of FIG. 2a. FIG. 2a is seen at the right angles to the arrow II. In each case, two respective sections of laser conduit, designated 214 and 215 are connected together. There is a first engagement member 216 which is rotatably mounted about a single axis with respect to the first laser beam conduit section 214. The engagement member is further rotatably connected to a second engagement member 217 at a rotatable mounting 218. The second engagement member 217 is rotatably mounted with respect to the second laser beam conduit section 215 at a rotatable mounting 219. Shown in dotted lines is the line 220 of the laser beam and the positions 221 and 222 of laser beam turning mirrors. The structure of the joint allows the laser beam conduit sections 214 and 215 to be rotatably mounted with respect to each other about two axes at right angles, giving maximum flexibility.

Also visible in FIG. 2 is a support system whereby, when the marking head 211 is held at any given height, it can remain suspended at that height.

The support means comprises a rotatably mounted beam 223 which is mounted on a pivot 224 on top of the laser emitter 108. A counterweight 225 is provided. At the end of the beam 223 there are three locking reels 226, 227 and 228. Locking reels are commercially available for example form the company Neddermann. Each comprises a spring loaded reel with wire round around it, the spring tending to rotate the reel in the winding-on direction. A locking means is provided which locks the wire in a set position. The wire of the locking means is releasable by a quick tug, after which the wire may be moved in or out of the reel. If the wire is held stationary for a moment, the locking means engages again, fixing the wire at the new position.

In this way, by applying a quick tug to the wire, it is unlocked and then pulled out or allowed to reel in under the force of the spring until the desired length is achieved, whereupon the wire is held in the position for a fraction of a second and the locking mechanism locks the wire at the position. Locking reel 326 is used to support the weight of the marking head 211. Locking reel 227 supports the weight of the first laser conduit section 204 and locking reel 228 supports the weight of the second laser conduit section 206.

When the marking head 211 is moved, the locking reels extend or contract accordingly. Further, the beam 223 will pivot to the position selected. In this way, the marking head 211 can be held at the desired position once it has been moved. Finally, FIG. 2 shows a magnet 229 on the marking head 211. The magnet 229 comprises a central electromagnet mounted co-axially with an annular permanent magnet. When the electromagnet is switched off, the magnetic field of the permanent magnet can be used to lock marking head 211 against a magnetic surface. When the electromagnet is switched on, it is arranged that the magnetic field of the electromagnet cancels out the magnetic field due to the permanent magnet, allowing the marking head to be released.

The marking head 211 further comprises a control input 213, operable by an operator, as will be described further below in relation to FIG. 3.

FIG. 3 shows a schematic cross section through the marking head 211 of FIG. 2. The marking head 211 includes a casing 301 connected at the top to the fourth conduit section 208 by connection of a design which is known in the art of laser welding. At the left-hand side of the marking head, there is a germanium window 212 which is transparent to infrared radiation of the type generated by the carbon dioxide laser emitter 108. It is protected by a structure 302 formed of a resilient material. The structure 302 is shown adjacent to a piece of window glass 303 of a vehicle in a position in which marking can commence.

The path of a laser beam is shown by a dotted line 304. The beam enters the marking head 211 at the top and is diverted by a fixed mirror 305. The diverted laser beam then impinges on a mirror 306 which is mounted on the rotatable shaft of a galvanometer 307. The angular position of the shaft of the galvanometer 307 may be varied in response to signals input to the galvanometer along a signal line 308. The laser beam is then deflected along a path 309 whose exact position will depend upon the angular position of the mirror 306. The deflected laser beam then impinges on a second rotatable mirror 310 which is mounted on the shaft of a second galvanometer 311. The second mirror 310 is mounted so that the normal to the mirror extends right angles to the shaft of the galvanometer 311. Galvanometer 311 is mounted so that its shaft extends generally at right angles to the shaft of the galvanometer 307. The angular position of the mirror 310 may be varied by the galvanometer 311 in response to signals sent along line 312. Varying the position of the galvanometer 311 alters the position of the laser beam in a direction which is at right angles to the direction in which is it altered by the mirror 306. In this way, the final path of the laser beam 313 may be varied in two directions at right angles, allowing the laser beam to be swept through any pattern required, by giving appropriate signals to the galvanometers 307 and 311.

A pair of switches 314 are provided, mounted at the end of the structure 302. The switches 314 are configured such that, when they are depressed, a signal is given along lines 315, 316 to a control box 317.

The switches 314 are provided as a safety feature. In practice, a further switch 314 is provided (not shown), the three switches 314 lying in a pattern which extends over two dimensions. The control box 317 is configured such that it will only allow the laser to be fired if all of the switches 314 are depressed. This ensures that the laser may only be fired if the marking head 211 is in close contact with the surface of the window glass 303.

Finally, an operator control 213 is provided. The operator control 213 is rigidly fixed with respect to the marking head 211 on a bracket 318. The operator control further comprises control buttons. There is a first pair of control buttons 319. By pressing one or other of these buttons 319, the first laser mounting structure shown in FIG. 4 may be displaced to the left or right. A second pair of buttons 320 is provided. By depressing one or other of these buttons, the second laser mounting 122 may be displaced into or out of the paper in FIG. 4 as selected by the operator. In this way, the position of the laser 108 can be controlled by the operator. Finally, two laser fire buttons 321 are provided. Depressing both laser fire buttons 321 sends a signal along the control wire 322 to the control box 317. Control box 317, as noted above, will contain circuitry which will only permit the fire signals to be transmitted to the laser emitter 108 itself if all of the buttons 314 are depressed.

A further signal line 323 is provided extending from the control box 317. The signal wire 323 extends along the laser arm 110 and is connected, via a flexible connection, to the laser control means 131, as described further below. The wire 323 suitably comprises a bundle of wires for transmitting different signals, for example control signals for the galvanometers 307 and 311, control signals for the motors 114 and 124 for positioning the laser and laser fire signals for operating the laser.

FIG. 5 is a schematic illustration of the laser control system 131. At the centre of the system is a processor unit 501. The processor unit 501 is configured to receive inputs from an input means 502. The input means can receive information via a communications network 503, for example the public switch telephone network or the Internet. Input unit 502 can also receive signals from the barcode reader 133 reading a barcode for example 504. The input unit 502 may further receive inputs from a keyboard 132.

The processor 502 is further connected to a data store 505. The laser controller 131 is further connected to the laser controller 135.

The input unit 502 is used to input to the processor 501 vehicle marking data. The input unit may receive this data by any of the communication network 503, barcode reader 133 or keyboard 132.

The vehicle marking data will comprise a vehicle identification number (a number assigned to each vehicle by an international organisation), a description of the vehicle (for example type of vehicle and colour), a code to be marked on the vehicle and the number of windows of the vehicle to be marked. The processor 501 receives the vehicle marking data and stores it in the data store 505. When a vehicle is placed in the vehicle station 102 in order to be marked, an operator of the system will be able to input the vehicle identification number which will be marked on the vehicle. The operator may use the keyboard or a barcode reader in order to do this. When the processor 501 receives the vehicle identification or number of the vehicle to be marked, the processor checks in the data store 505 for a corresponding stored vehicle identification number. When the corresponding stored vehicle identification number is found, the processor displays the information on the screen 134 for confirmation by the operator. For example, the operator will be able to check that the description reported on the screen matches the vehicle in the vehicle station. The operator will be given the option of confirming that the vehicle has been correctly identified. Once this has been confirmed, the vehicle marking data is sent to the laser controller 135. The system is then ready for use.

The laser controller 135 is configured to produce three control signals which vary over time in a synchronised manner. The first signal controls whether the laser 108 is on or off. The second signal is directed along control line 136 to the marking head 111 and controls the vertical position of the laser beam. The third signal is also transmitted down the control line 136 to the laser-marking head 111 and controls the horizontal position of the laser beam. The laser controller 135 will be configured to control the laser 108 and marking head 111 to produce the desired code for the vehicle. In order to mark the vehicle, the operator simply has to place a marking head 111 with the laser window adjacent the windows to be marked so that the buttons 114 are all depressed and press the laser fire button. This will send a signal to the laser controller 135 to commence the laser marking. The laser controller 135 will then send signals as described above to the laser 108 and to the galvanometers in the marking head 111 to produce the desired mark.

A laser controller and laser of this type is commercially available, for example from Rofin Sinar UK limited.

The operator will then mark as many windows of the vehicle as instructed on the screen 134. Once all windows have been marked, the operator may use, for example, the keyboard 132 to input a signal to the processor 501 to indicate that all windows have been marked. The processor is then configured to enter into the data store 505 that the vehicle has been marked. Once the allotted number of marks has been made for a given vehicle, and the signal has been given to indicate that all windows have been marked, the processor is configured to prevent the same numbers being used again, in order to avoid different vehicles being marked with the same number. Preferably, the processor is configured to allow the operator to request additional marks for a particular vehicle, for example, for marking a sunroof.

The processor is further configured so that the user cannot start marking another vehicle until the allotted number of marks has been made. If a vehicle does not have enough surfaces for making the allotted number of marks, a laser absorbing surface may be provided which the operator can mark instead. For example, a sheet of glass may be provided adjacent to the vehicle marking station.

In FIG. 6, the first track member 112 of the framework and the track member 121 of the first laser support are shown schematically. Also shown schematically are the first stationary guide member 139, the first movable guide member 140, the second movable guide member 142 which is fixed with respect to the track 121 and the third movable guide member 143. In each of the guide members 140, 142 and 143, a slot is formed, in a shape of a curve of radius greater than or equal to 30 cm. The slot is made large enough to just contain the radio frequency cable 137 and to be smooth enough to allow the cable to slide along the slot.

It can be seen that there are four unsupported lengths of radio frequency cable. One length 602, extends between the stationary guide 139 and the first movable guide 140. The second length, 603, extends between the first movable guide 140 and the second stationary guide 142. The third as supported length 604 extends between the second movable guide 142 and the third movable guide 143 and the fourth unsupported length 605 extends between the third movable guide 143 and the laser 108.

If the laser 108 is displaced in the direction Y, the tendency will be for the unsupported length 603 to shorten. However, as the radio frequency cable 137 is relatively stiff, the first movable guide 140 will be displaced, also in the direction Y by a distance equal to half the distance through which the laser 108 is moved. In this way, any slack is taken up and kinks are prevented from being formed. Similarly, if the laser 108 is displaced in the direction X, the unsupported lengths 605 will become shorter and the unsupported length 604 will become longer by about half the distance that the laser 108 is moved, the third movable guide 143 being displaced, also in the X direction by a distance equal to half the distance moved by the laser 108.

In this way, the laser can be moved to any position, on the structure without introducing undesirable bends into the radio frequency cable.

The arrangement is shown graphically in FIG. 8.

In FIG. 8, the first, second and third movable guides 140, 142 and 143 are shown schematically. The position of the laser 108 is defined by the co-ordinates (x, y). The position in the Y direction of the movable guide 140 from the laser 108 is denoted $l_1$. The position of the second movable guide 143 from the laser 108 in the X direction is denoted $l_2$. It can be seen that the total length L of the radio frequency cable in the framework is $$L = y + 2l_1 + x + 2l_2$$

Also shown, in dotted lines, is the extreme position of the laser 108, when is moved to the very edges of its movement, by the maximum displacement (X, Y). It is clear that, in this case, the total length L of the radio frequency cable is given by:

$$L = X + Y$$

Accordingly:

$$X + Y = y + x + 2l_1 + 2l_2.$$

For any position of the laser (x, y) the first and third movable guides 140 and 143 will be moved automatically to a position ($x+l_2$, $y+l_1$) as defined by the above equation.

Each of the first and third movable guides are constructed as shown in FIG. 7. The guide shown in FIG. 7 comprises a structure 701, suitably made from moulded thermoplastic. The structure 701 comprises a substantially flat plate 702 with a curved track defined in it. The curved track is defined by curved flanges 704 and 705. The surface 706 is connected to the surface 702 by three webs 707, 708 and 709 extending between the surfaces. The webs are positioned so that they do not obstruct the space between the flanges 704 and 705. The flanges 704 and 705 are configured to be the correct width and spacing to permit a radio frequency cable to slide smoothly between them. Finally, bearings 710 are provided at top and bottom of the structure to allow the structure to move smoothly and quickly on the track members 112 and 121.

FIG. 9 is a schematic view of a second embodiment of laser mounting system. The embodiment of FIG. 9 can be placed in the arrangement of FIG. 1 in replacement of the laser emitters 108 and 109. FIG. 9 is as seen in the Y direction of FIG. 1.

The first laser support is substantially the same as the laser support 113 shown in FIG. 1. This supports a pair of rails 121 shown in dotted lines in FIG. 9. A second laser support, also shown in dotted lines, 901 runs on the rails 121 on wheels 902 and is propelled by similar mechanism to that shown in FIG. 4. The second laser support 901 supports a structure 903 which comprises a cylindrical guide member 904 and, slidably mounted in the cylindrical guide member, a third laser support 905. A pneumatic cylinder or motor driven screw 906 is provided, mounted on the support structure 904 and connected to the third laser mounting 905 by a piston rod 907.

A laser emitter 908 is shown mounted on the third laser support 905.

The pneumatic cylinder 906 can be used to raise and lower the laser emitter 908 in the Z direction.

In this way, a plurality of laser mounting positions can be provided, located at different heights, the position of the laser emitter being continuously variable between all of them.

Figure 10:
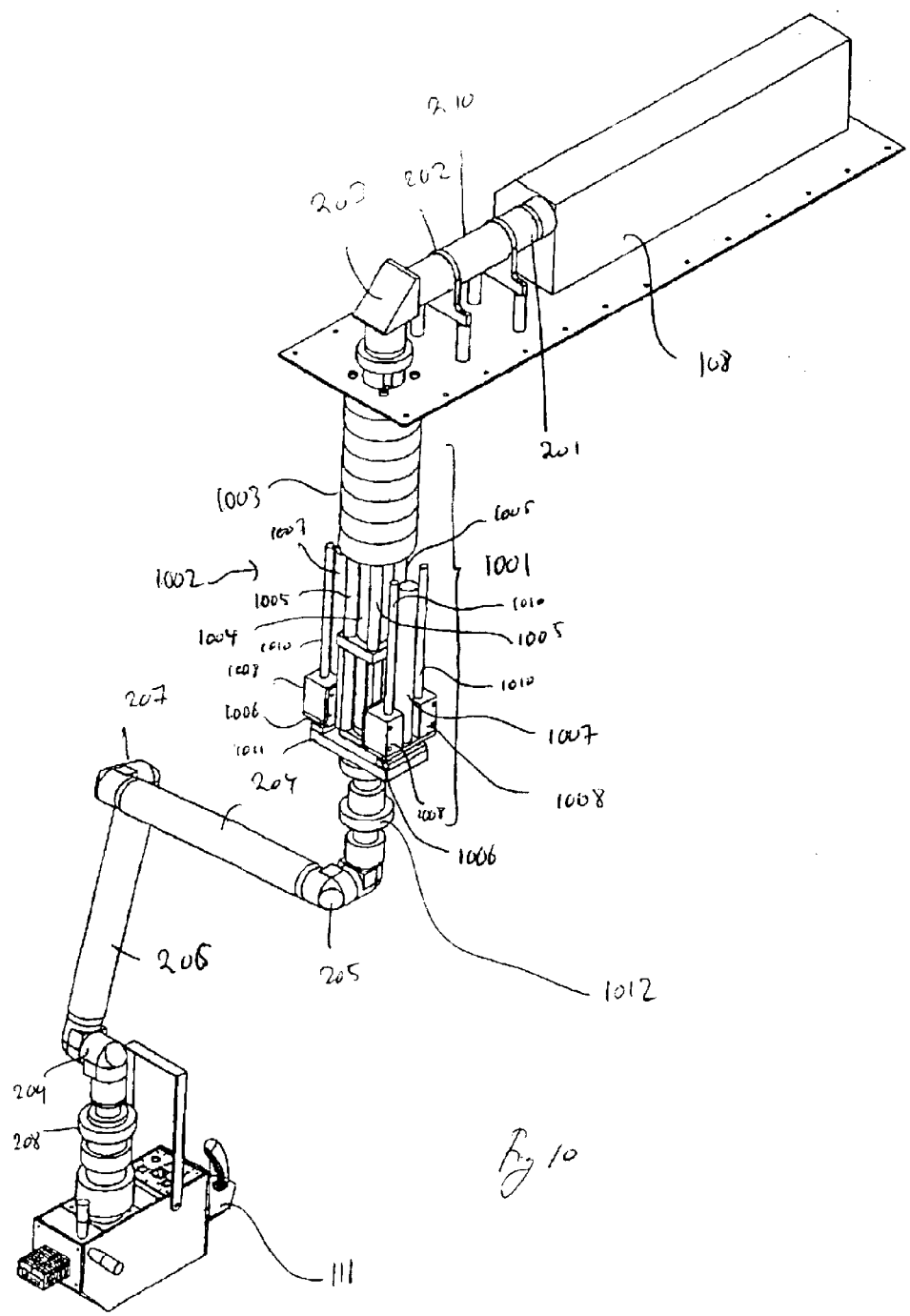
FIG. 10 is a sketch isometric view of an alternative design of laser beam delivery means for use with the present invention.

FIG. 10 is a sketch isometric view of a second embodiment of laser beam delivery means for use with the present invention. It may be used in place of the laser emitter and laser beam delivery means shown in FIG. 2. The laser emitter 108, first laser beam conduit section 202, adjusting section 210, rigid bend 203, laser beam conduit section 204 and 206, flexible joints 205, 207, 208, laser beam conduit section 208 and marking head 111 are substantially the same as described in relation to FIG. 201 and will not be described further. The support means described in relation to FIG. 2 will be present in the apparatus for FIG. 10, but is not shown, for clarity.

The laser beam delivery means of FIG. 10 includes a further laser beam conduit section 1001 which is longitudinally extendable. Its axis is fixed extending in a vertical direction, but its length may be extended or contracted in that direction. The longitudinally extendable conduit section 1001 comprises an upper section 1002 comprising a first built up section 1003, a second tubular section 1004 which is held inside four linearly extending braces 1005 to give it strength. At the bottom of the conduit section 1002 there are a pair of plates 1006 each mounting a drive cylinder 1007 and bearing blocks 1008 each of which has a longitudinally extending hole which extend parallel to the direction of extension of the conduit section 1001, for mounting guide rods 1010. The guide rods 1010 are fixed to a plate 1011 fixed to a lower, movable section 1012 of the longitudinally extendable conduit section 1001. Piston rods from the cylinder 1007 act on the plates 1011 to push it up or down. By actuating the piston, the length of the longitudinally extendable conduit section 1001 can be increased or decreased.

FIG. 11 shows a cross-sectional view through the longitudinally extendable conduit section 1001 of FIG. 10. The rest of the apparatus has been omitted for clarity. The bearing blocks 1008, support rods 1005 and guide rods 1010 are omitted for clarity. The built up section 1003 of the upper laser beam conduit section 1002 can be seen. The tubular section 1004 can be seen extending from the built up section to the bottom of the laser beam conduit section 1002. 1013 which are displaceable inside the cylinders 1007 can be seen at their uppermost position in FIG. 11. They are connected by piston rods 1014 to the plate 1011 which drives the movable section 1012 up and down. A telescopic laser beam conduit tube 1015 can be seen, which is fixed to the plate 1011 and is longitudinally slidable inside the built up section 1002 and tubular section 1004. FIG. 12 shows the apparatus in the extended position. The piston 1013 have been driven to the lower most position, driving the plate 1011 downwardly. The laser beam conduit tube has been extended downwardly inside the built up section 1003 and tubular section 1004.

The present invention has been described above purely by way of example, and modifications can be made within the spirit of the invention, which extends to equivalents of the features described. The invention also consists in any individual features described or implicit herein or shown or implicit in the drawings or any combination of any such features or any generalisation of any such features or combination.

What is claimed is:

1. An apparatus for marking vehicles, comprising:
   a structure extending adjacent to a vehicle station;
   the structure defining at least three laser mounting positions spaced apart from one another in at least two dimensions, for mounting at least one laser apparatus, the laser apparatus comprising a laser for producing a laser beam adapted to mark a part of the vehicle and a flexible laser beam conduit for delivering a laser beam from the laser to a selectable point of the vehicle station, the laser apparatus being movable between at least two of the laser mounting positions.

2. An apparatus according to claim 1 wherein there are at least four laser mounting positions.

3. An apparatus according to claim 2, wherein a laser apparatus is provided which is movable between all of the first, second, third and fourth laser mounting positions.

4. An apparatus according to claim 3, further comprising at least one first track extending between a first second laser mounting position, along which a first laser support is movable, and a second track extending from the first laser support in a direction which is not parallel to the first track, a second laser support being provided which is movable along the second track, the laser apparatus being mounted on the second laser support.

5. An apparatus according to claim 1, wherein the laser beam conduit does not exceed 3.0 m in length, more preferably does not exceed 2.5 m in length and most preferably does not exceed 2.3 m in length.

6. An apparatus according to claim 1, wherein the laser comprises a carbon dioxide gas laser or an excimer laser.

7. An apparatus according to claim 6, wherein the laser comprises a radio frequency excited carbon dioxide laser.

8. An apparatus according to claim 1, wherein at least two of the laser mounting positions are located at different heights, a drive being provided for moving the laser apparatus between the laser mounting positions at different heights.

9. The apparatus according to claim 8, wherein the drive for moving the laser apparatus between the laser mounting positions at different heights comprises a pneumatic cylinder, motor driven screw or hydraulic cylinder.

10. An apparatus according to claim 1, wherein the laser beam conduit comprises at least two laser conduit sections joined together at a connection, the conduit sections being rotatably mounted with respect to each other at the connection.

11. The apparatus according to claim 10, wherein the conduit sections are rotatably mounted with respect to each other at the connection about two axis.

12. The apparatus according to claim 10, wherein there are at least three laser conduit sections.

13. The apparatus according to claim 10, wherein the laser beam conduit sections are each no more than one meter in length.

14. An apparatus according to claim 1, wherein the average power of the laser is 5–20 watts, the duty cycle comprising the ratio of time for which the laser is on to the time for which the laser is off is in the range 30–50% and the scanning speed of the laser beam over the part of the vehicle to be marked is 3000–6000 mm/s.

15. A method of marking a vehicle comprising:

placing a vehicle in a vehicle station marking at least one part of the vehicle using vehicle marking apparatus mounted on a structure extending adjacent to the vehicle station, the structure defining at least three laser mounting positions spaced apart from one another in at least two dimensions, for mounting at least one laser apparatus, the laser apparatus comprising a laser for producing a laser beam adapted to mark part of the vehicle and a flexible laser beam conduit for delivering a laser beam from the laser to a selectable point of the vehicle station, the laser apparatus being moved between at least two of the laser mounting positions to allow different parts of the vehicle to be marked.

16. An apparatus for marking vehicles, comprising:

a structure extending adjacent to a vehicle station;

the structure defining at least three laser mounting positions spaced apart from one another in at least two dimensions, for mounting at least one laser apparatus, the laser apparatus comprising a laser for producing a laser beam adapted to mark a part of the vehicle and flexible laser beam delivery means for delivering a laser beam from the laser to a selectable point of the vehicle station, the laser apparatus being movable between at least two of the laser mounting positions.

17. A method of marking a vehicle comprising:

placing a vehicle in a vehicle station marking at least one part of the vehicle using vehicle marking apparatus mounted on a structure extending adjacent to the vehicle station, the structure defining at least three laser mounting positions spaced apart from one another in at least two dimensions, for mounting at least one laser apparatus, the laser apparatus comprising a laser for producing a laser beam adapted to mark part of the vehicle and flexible laser beam delivery means for delivering a laser beam from the laser to a selectable point of the vehicle station, the laser apparatus being moved between at least two of the laser mounting positions to allow different parts of the vehicle to be marked.

* * * * *

UNITED STATES PATENT AND TRADEMARK OFFICE
CERTIFICATE OF CORRECTION

PATENT NO.    : 6,815,637 B2
DATED         : November 9, 2004
INVENTOR(S)   : John T. Bell et al.

Page 1 of 1

It is certified that error appears in the above-identified patent and that said Letters Patent is hereby corrected as shown below:

<u>Title page,</u>
Insert Item: -- [30]    Foreign Application Priority Data

February 28, 2002    (EU)                    02251416.0 --.

Signed and Sealed this

Fifteenth Day of November, 2005

JON W. DUDAS
*Director of the United States Patent and Trademark Office*